US012698706B2

(12) United States Patent
Johnson et al.

(10) Patent No.: US 12,698,706 B2
(45) Date of Patent: Aug. 4, 2026

(54) SPATIAL CHARACTERIZATION OF DYSFUNCTION IN DOWNHOLE SYSTEMS

(71) Applicant: Schlumberger Technology Corporation, Sugar Land, TX (US)

(72) Inventors: Ashley Bernard Johnson, Milton (GB); Aaron Paul Simon, Oklahoma City, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 423 days.

(21) Appl. No.: 18/363,318

(22) Filed: Aug. 1, 2023

(65) Prior Publication Data

US 2024/0052740 A1 Feb. 15, 2024

Related U.S. Application Data

(60) Provisional application No. 63/371,247, filed on Aug. 12, 2022.

(51) Int. Cl.
| | |
|---|---|
| *E21B 47/085* | (2012.01) |
| *E21B 41/00* | (2006.01) |

(Continued)

(52) U.S. Cl.
CPC ............ *E21B 47/085* (2020.05); *E21B 44/00* (2013.01); *G01H 1/10* (2013.01); *E21B 41/00* (2013.01);

(Continued)

(58) Field of Classification Search
CPC .... E21B 47/085; E21B 44/00; E21B 2200/20; E21B 47/024; E21B 41/00; E21B 49/003;

(Continued)

(56) References Cited

U.S. PATENT DOCUMENTS

| | | | | |
|---|---|---|---|---|
| 2017/0284185 A1* | 10/2017 | Hohl | ....................... | E21B 47/00 |
| 2021/0270120 A1* | 9/2021 | Hohl | ..................... | E21B 49/003 |

(Continued)

OTHER PUBLICATIONS

Sugiura et al. ("Simulation and measurement of high-frequency torsional oscillation (HFTO)/high-frequency axial oscillation (HFAO) and downhole HFTO mitigation" SPE Drilling & Completion 35.04 Dec. 17, 2020: 553-575.) (Year: 2020).*
Johnson et al. ("Characterizing Drilling Dysfunction: Taking the T Out of HFTO." Paper presented at the IADC/SPE International Drilling Conference and Exhibition, Galveston, Texas, USA, Mar. 2022. doi: https://doi.org/10.2118/208720-MS) (Year: 2022).*

(Continued)

*Primary Examiner* — Christian T Bryant
(74) *Attorney, Agent, or Firm* — Jeffrey D. Frantz

(57) ABSTRACT

Methods and systems are provided that determine data characterizing spatial variation of vibrational dysfunction (such as HFTO) along the BHA of a drilling system. In embodiments, such data can be determined from a minimal set of measurements of any or all of four variables that include: vibration amplitude; vibration wavelength; vibration frequency; and the axial position of the first vibrational node. In embodiments, such data can be determined from measurements of vibration amplitude and vibration frequency of a BHA at two fixed positions along the BHA (e.g., with two sensors offset axially along the BHA). In other embodiments, such data can be generated from the estimated position of the first vibrational node and measurements of vibration amplitude and vibration frequency by a single sensor disposed at a fixed axial position along the BHA.

20 Claims, 7 Drawing Sheets

(51) Int. Cl.

| | |
|---|---|
| *E21B 44/00* | (2006.01) |
| *E21B 47/024* | (2006.01) |
| *E21B 47/13* | (2012.01) |
| *E21B 49/00* | (2006.01) |
| *G01H 1/10* | (2006.01) |
| *G01V 1/40* | (2006.01) |

(52) U.S. Cl.
CPC ............. *E21B 47/024* (2013.01); *E21B 47/13* (2020.05); *E21B 49/003* (2013.01); *E21B 2200/20* (2020.05); *G01V 1/40* (2013.01)

(58) Field of Classification Search
CPC ........... E21B 47/00; E21B 47/13; G01H 1/10; G01V 1/40; G01V 3/18
See application file for complete search history.

(56) References Cited

U.S. PATENT DOCUMENTS

| | | | |
|---|---|---|---|
| 2022/0112775 A1* | 4/2022 | Peters | E21B 17/073 |
| 2023/0028108 A1* | 1/2023 | Chen | E21B 47/013 |

OTHER PUBLICATIONS

Jain et al. ("High-Frequency Torsional Dynamics of Drilling Systems: An Analysis of the Bit-System Interaction." Paper presented at the IADC/SPE Drilling Conference and Exhibition, Fort Worth, Texas, USA, Mar. 2014. doi: https://doi.org/10.2118/167968-MS) (Year: 2014).*

Hill et al. ("Methodology and Array Technology for Finding and Describing Leaks in a Well." Paper presented at the SPE Annual Technical Conference and Exhibition, Dubai, UAE, Sep. 2016. doi: https://doi.org/10.2118/181497-MS) (Year: 2016).*

* cited by examiner

SPATIAL CHARACTERIZATION OF DYSFUNCTION IN DOWNHOLE SYSTEMS

CROSS-REFERENCE TO RELATED APPLICATIONS

This application claims priority from U.S. Provisional Appl. No. 63/371,247, filed on Aug. 12, 2022, herein incorporated by reference in its entirety.

FIELD

The present disclosure relates to characterizing high-frequency torsional oscillation in drilling systems.

BACKGROUND

The dynamics of present-day drilling systems are complex. The drilling systems incorporate a bottomhole assembly (BHA) that typically includes a long slender beam with a very high aspect ratio that suffers a myriad of instabilities. High-frequency torsional oscillation (HFTO) is a torsional vibration of the BHA which can vary in amplitude along the BHA. HFTO at frequencies above a few Hz has been identified as a cause of damage to drilling systems. Such damage can include cracks in collars, washouts, damage to electronic components, as well as over torqued joints or the back off of tool components.

Using high-speed data recorders, HFTO characteristics can be measured in drilling systems. Examples include torsional oscillations at about 56 Hz, as well as other harmonics. Modelling may also be done to predict possible resonant frequencies.

SUMMARY

According to aspects of the present disclosure, methods and systems are provided that determine data characterizing spatial variation of vibrational dysfunction (such as HFTO) along the BHA of a drilling system.

The amplitude of vibrational dysfunction such as HFTO can depend on axial position along the BHA. With a sensor (e.g., an accelerometer or gyro or other transducer) positioned close to a node of the vibrational dysfunction, a measurement of vibration amplitude determined by the sensor can represent a small fraction of the actual amplitude of the vibrational dysfunction.

According to aspects of the present disclosure, data characterizing spatial variation of vibrational dysfunction (such as HFTO) along the BHA of a drilling system can be determined from a minimal set of measurements. Specifically, the set of measurements can include measurements of any or all of four variables that include: vibration amplitude; vibration wavelength; vibration frequency; and the axial position of a first vibrational node.

In embodiments, vibration frequency and vibration wavelength can be coupled with an understanding of acoustic velocity. As a result, measurements of vibration frequency, vibration wavelength and acoustic velocity can be used to determine data characterizing spatial variation of vibrational dysfunction (such as HFTO) along the BHA of a drilling system.

In embodiments, measurements of vibration amplitude and vibration frequency of a BHA at two fixed positions along the BHA (e.g., with two sensors offset axially along the BHA) can be used to determine data characterizing spatial variation of vibrational dysfunction (such as HFTO) along the BHA of a drilling system.

In embodiments, a position of the first vibrational node can be estimated from the geometry of the BHA and a map that characterizes spatial variation of vibrational dysfunction (such as HFTO) along the BHA of a drilling system can be generated from the estimated position of the first vibrational node and measurements of vibration amplitude and vibration frequency by a single sensor disposed at a fixed axial position along the BHA.

This summary is provided to introduce a selection of concepts that are further described below in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Embodiments of the present disclosure relate to detecting drilling dysfunction. More particularly, some embodiments relate to estimating or otherwise determining or characterizing torsional vibration (e.g., HFTO) in a drilling system. Such characterization or determinations can include determining data characterizing spatial variation of the torsional vibration (e.g., HFTO) along all or a portion of a length of the drilling system. The spatial variation may be characterized by a map and optionally can be based on an estimate of a location of a first vibrational node of the torsional vibration.

In drilling systems, no commercial efforts have been identified to understand and correct for the spatial variation of vibration such as HFTO. In particular, a single measurement of vibration may be taken to identify what is happening at a single location. The location-specific vibration measurement can include a measurement of acceleration, torque, etc. However, the location-specific vibration has not been used to determine and map variation of vibration along a greater length to understand the vibration experienced by the drilling system at various axial locations of a drilling system.

Drilling systems can experience vibration that can damage the drilling system. For example, torsional oscillations can be generated in a downhole drilling system during drilling activities. An oscillation node for the torsional oscillations may be located at contact points between the downhole drilling system and the wellbore well. Torsional stresses at the oscillation node may cause failure of one or more structural components of the drilling system. Improved methods that predict the location of such torsional oscillations and mitigate such torsional oscillations are described herein.

Figure 1:
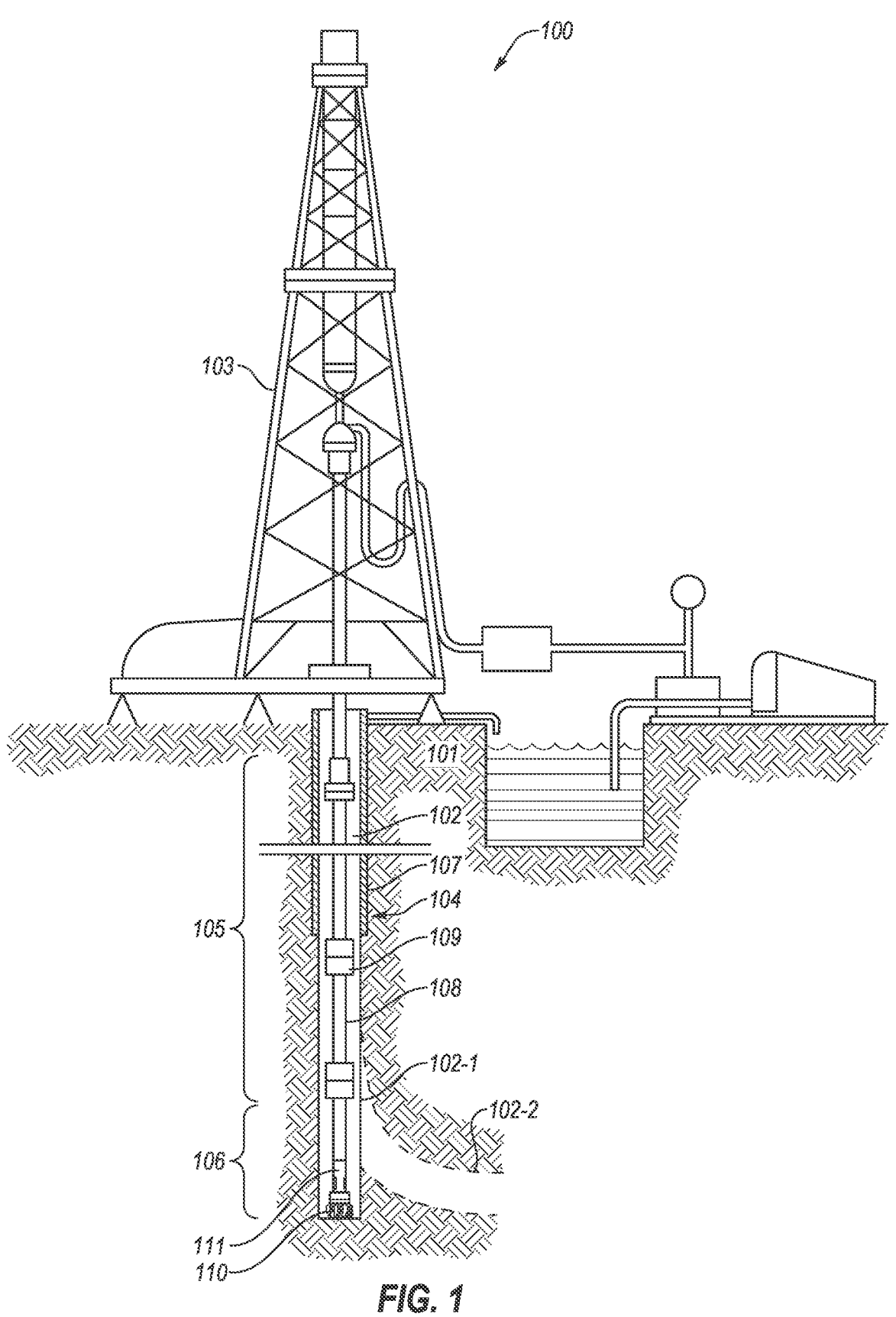
FIG. 1 is a representation of a downhole drilling system according to at least one embodiment of the present disclosure.

By way of background, FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly (BHA) 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through nozzles, jets, or other orifices in the bit 110 for the purposes of cooling the bit 110 and cutting structures thereon, for lifting cuttings out of the wellbore 102 as it is being drilled, for controlling influx of fluids in the well, for maintaining the wellbore integrity, and for other purposes.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or damping tools, other components, or combinations of the foregoing. The BHA 106 may further include a directional tool 111 such as a bent housing motor or a rotary steerable system (RSS). The directional tool 111 may include directional drilling tools that change a direction of the bit 110, and thereby the trajectory of the wellbore. In some cases, at least a portion of the directional tool 111 may maintain a geostationary position relative to an absolute reference frame, such as gravity, magnetic north, or true north. Using measurements obtained with the geostationary position, the directional tool 111 may locate the bit 110, change the course of the bit 110, and direct the directional tool 111 on a projected trajectory. For instance, although the BHA 106 is shown as drilling a vertical portion 102-1 of the wellbore 102, the BHA 106 (including the directional tool 111) may instead drill directional or deviated well portions, such as directional portion 102-2.

In general, the drilling system 100 may include additional or other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

In some embodiments, the BHA 106 may include a downhole motor to power downhole systems and/or provide rotational energy for downhole components (e.g., rotate the bit 110, drive the directional tool 111, etc.). The downhole motor may be any type of downhole motor, including a positive displacement pump (such as a progressive cavity motor) or a turbine. In some embodiments, a downhole motor may be powered by the drilling fluid flowing through the drill pipe 108. In other words, the drilling fluid pumped downhole from the surface may provide the energy to rotate a rotor in the downhole motor. The downhole motor may operate with an optimal pressure differential or pressure differential range. The optimal pressure differential may be the pressure differential at which the downhole motor may not stall, burn out, overspin, or otherwise be damaged. In some cases, the downhole motor may rotate the bit 110 such that the drill string 105 may not be rotated at the surface, or may rotate at a different rate (e.g., slower) than the rotation of the bit 110.

The bit 110 in the BHA 106 may be any type of bit suitable for degrading downhole materials such as earth formation 101. Example types of drill bits used for drilling earth formations are fixed-cutter or drag bits, roller cone bits, and combinations thereof. In other embodiments, the bit 110 may be a mill used for removing metal, composite, elastomer, other downhole materials, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole. In still other embodiments, the bit 110 may include a reamer. For instance, an underreamer may be used in connection with a drill bit and the drill bit may bore into the formation while the underreamer enlarges the size of the bore.

During drilling, the BHA 106 will experience various vibrational and other forces, and the forces may vary (oftentimes significantly) between different tools or positions in the BHA 106. For instance, the directional tool 111 may include a mud motor or RSS, and torsional oscillations and resonance may occur below the directional tool 111 (or below the RSS or motor thereof). The oscillations and resonance below the directional tool 111 may be significantly different from oscillations above the motor or RSS. In some cases, pressure perturbations may drive oscillations through steering pads or cutters in an RSS and may not be as significant in other parts of the BHA 106.

High frequency torsional oscillations (HFTO) are a particular category of oscillations that occur within drilling tools and which can have a destructive impact. HFTO may be found in a frequency range of 60 to 350 Hz (along with harmonics) and can be primarily torsional; however, it should be understood that, in some situations, there may be a strong axial component accompanying HFTO. For instance, axial oscillations can be seen with frequencies up to 1200 Hz. In some cases, the axial component can even be dominant with respect to the torsional oscillations. This behavior can be observed with a definitive correlation to acoustic noise in the mud system. Accordingly, high frequency oscillations (HFO) can be both torsional and axial in some embodiments. As used herein, HFO and HFTO may be considered for use interchangeably, and both can include torsional and axial oscillations. For instance, HFO with primarily axial oscillations may nonetheless be considered HFTO as the axial oscillations can be coupled to torsional oscillation or motion.

Two types of HFTO are discussed in accordance with embodiments of the present disclosure, although other types and categories of HFTO and HFO may exist. Type 1 HFTO may be associated with, for example, a drilling motor-powered RSS in a downhole drilling system. For example, Type 1 HFTO may be associated with a downhole motor in the drilling system. In some embodiments, the rotation of the downhole motor (e.g., the turbine, the rotor, or other rotatable element of the downhole motor) may cause or contribute to Type 1 HFTO. Type 1 HFTO may have a relatively low frequency and can include a single oscillation node. For example, Type 1 HFTO may have a frequency of less than 300 Hz, with some harmonics. In some embodiments, Type 1 HFTO may be associated with drilling a vertical or lateral wellbore and can affect the length of the BHA below the motor.

Type 2 HFTO may have a relatively higher frequency of greater than 300 Hz, or between 150 Hz and 350 Hz, and potentially with many harmonics. In some situations, Type 2 HFTO may occur in downhole drilling systems that include a downhole motor. In some situations, Type 2 HFTO may also occur in downhole drilling systems that do not include a downhole motor. Thus, the existence of Type 2 HFTO can generally be independent of the presence and/or operation of a downhole motor. In some embodiments, Type 2 HFTO may be present or located closer to the bit than Type 1 HFTO. Type 1 HFTO and Type 2 HFTO may also be mutually exclusive. Put another way, when Type 1 HFTO is present, significant Type 2 HFTO may not be present, and when Type 2 HFTO is present, significant Type 1 HFTO may not be present.

Type 2 HFTO may be present in a curved section of a wellbore. Put another way, Type 2 HFTO may exist while the BHA bends and curves through a dogleg of a wellbore. In some embodiments, Type 2 HFTO may be present while drilling through the dogleg, or while drilling a lateral section while the BHA is still located within the dogleg. In some embodiments, Type 2 HFTO may be more likely to occur, or more severe, in wellbores having smaller radius of curvature (e.g., a tighter dogleg).

To mitigate HFTO, an energy damping system may be installed in the BHA. Energy damping systems may include movable elements within the BHA or drill string that absorb vibrations and oscillations. Such energy damping systems may help to reduce the magnitude and/or frequency of the HFTO. However, these conventional approaches do not consider the location of nodes (or touch points with the wellbore that affect node locations as discussed herein). Such energy damping systems are typically effective at locations along the BHA or drill string that experience movement, rather than at nodes where there is high strain but low displacement, but conventional approaches do not distinguish between locations. As discussed herein, the vibrations from HFTO may form a wave in the BHA.

Figure 2:
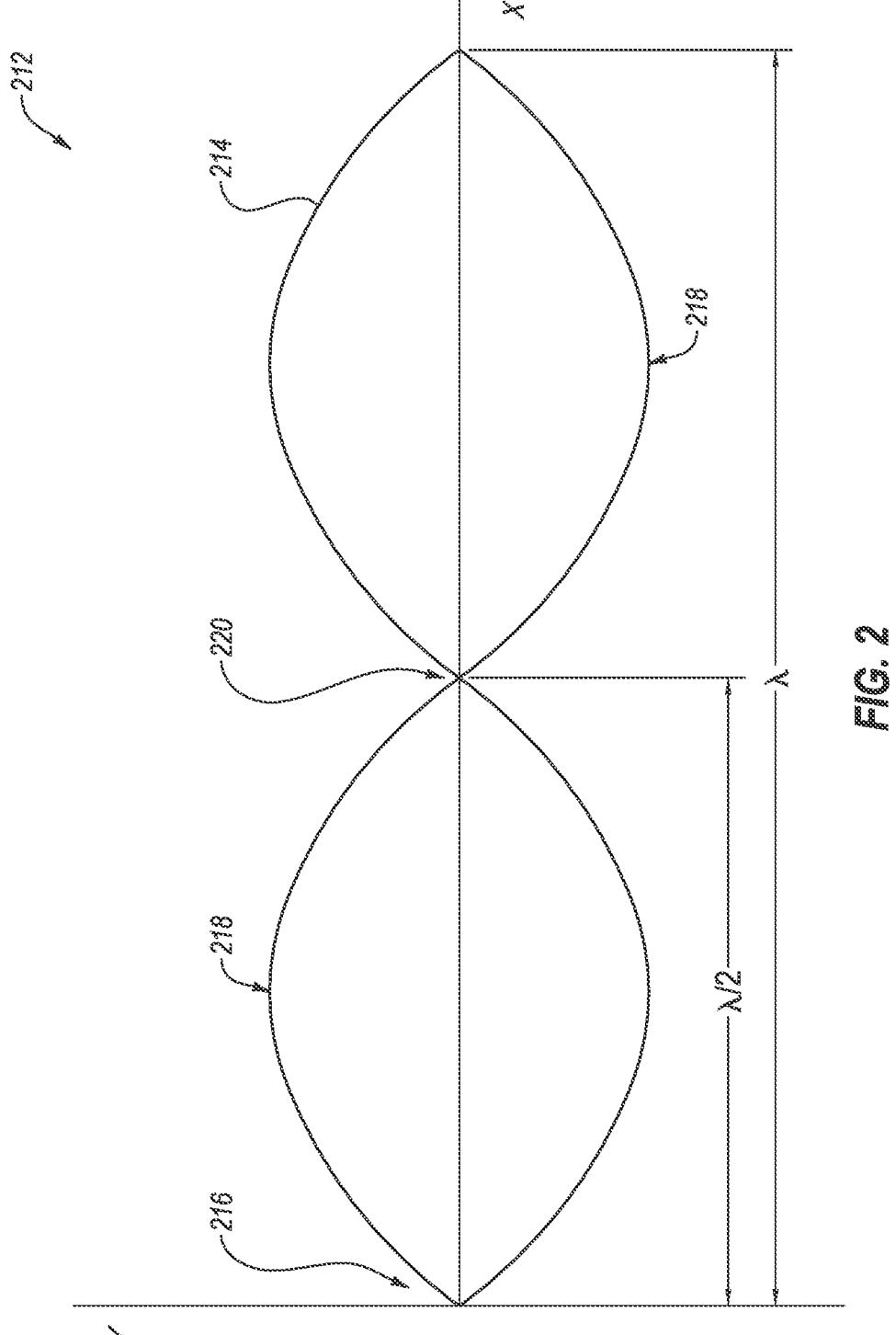
FIG. 2 is a representation of a waveform plot of high frequency torsional oscillation according to at least one embodiment of the present disclosure.

FIG. 2 is a plot 212 of an HFTO waveform 214, with distance on the horizontal axis (e.g., x-axis) and amplitude on the vertical axis (e.g., y-axis), according to at least one embodiment of the present disclosure. The HFTO waveform 214 may have a wavelength of λ. The wavelength λ may be the distance from a vibration or oscillation origin 216. As may be seen, the HFTO waveform 214 generally follows a sine wave, starting from the oscillation origin 216. The HFTO waveform 214 may increase in amplitude until it reaches a peak 218 or maximum amplitude. The amplitude may be considered the displacement distance of the BHA or drill pipe during HFTO. Thus, at the peak 218 of the HFTO waveform 214, the BHA may experience the maximum vibrational displacement.

After the peak 218, the HFTO waveform 214 may reduce in amplitude until an oscillation node 220. The oscillation node 220 may be at half of the wavelength λ, or λ/2. At the oscillation node 220, the amplitude of the HFTO waveform is zero. This may result in no or limited displacement of the BHA during HFTO at the oscillation node 220. The HFTO waveform 214 may then increase in amplitude past the oscillation node 220 (in the opposite direction) until reaching a peak 218 in the opposite direction. As discussed herein, displacement may be maximized at the respective peaks 218.

While experiencing minimized displacement at the oscillation node 220, torsional strain due to HFTO may be maximized at the oscillation node 220. In some situations, HFTO torsional strain may result in damage to the BHA. For example, HFTO torsional strain may result in weakening or failure (e.g., through cracking or breaking) of the housing or sub of an element of the BHA. In some examples, HFTO torsional strain may result in cracks or other breaks in plugs. In some examples, HFTO torsional strain may result in the buckling of a battery, electronics board, or other element of the BHA. In some examples, HFTO torsional strain may result in damage to a torquer (e.g., upper torquer) of an RSS. Damage to the elements of the BHA may result in additional cost for repair, additional time to trip out of the wellbore, time, and costs to replace damaged units, or even catastrophic failure of the BHA and separation of the BHA from the drill string.

As discussed herein, conventionally, to mitigate HFTO, an energy damping tool may be installed on the BHA; however, such energy damping tools typically mitigate the amplitude of the HFTO waveform 214, but do not significantly change the location of the oscillation node 220. Furthermore, such energy damping tools typically function by absorbing vibrational energy and would therefore be most effective when placed at the peak 218 of the HFTO waveform 214—while having reduced effectiveness if placed close to or at the oscillation node 220.

Figure 3:
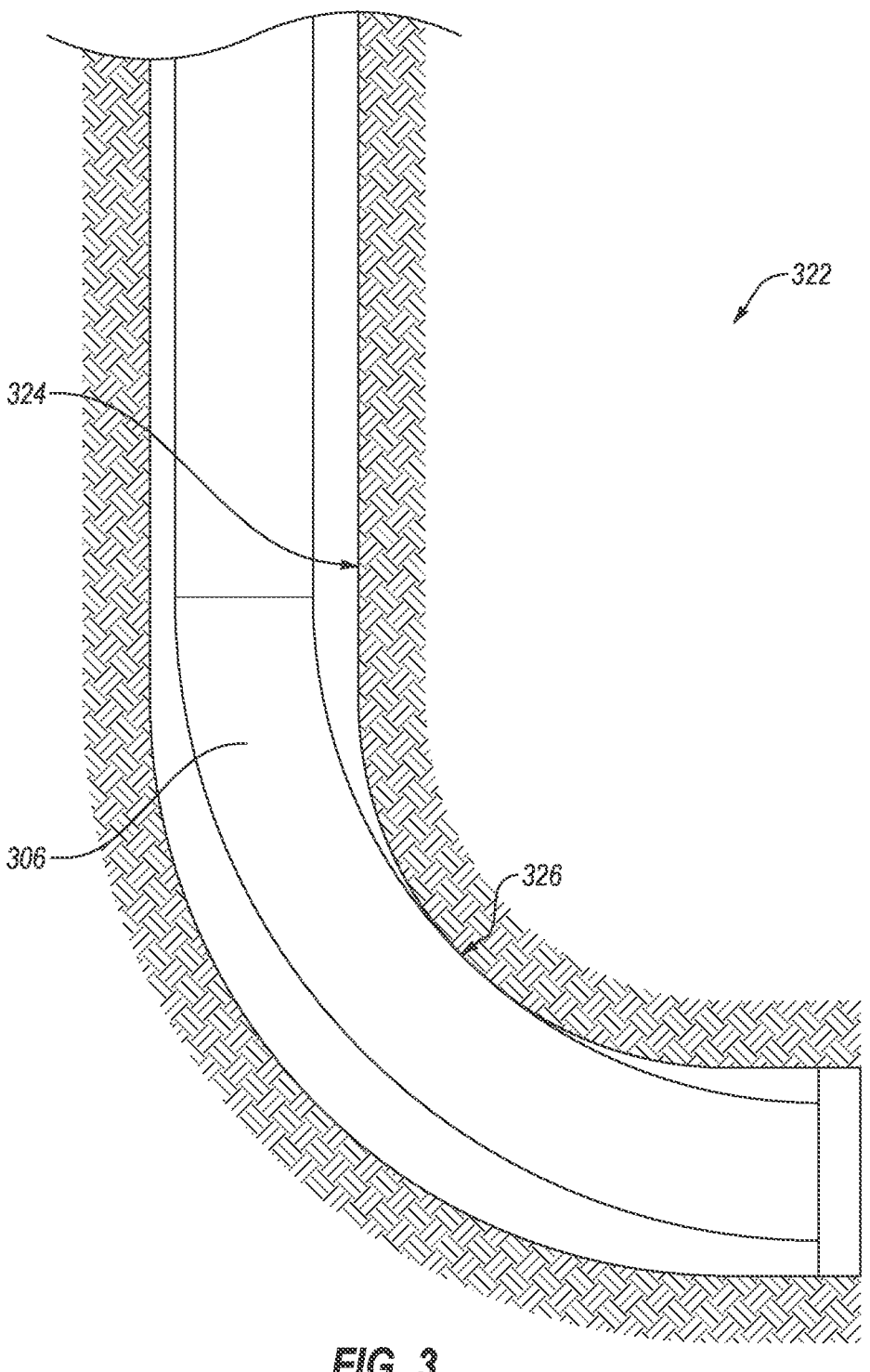
FIG. 3 is a representation of a dogleg in a wellbore according to at least one embodiment of the present disclosure.

FIG. 3 is a representation of a dogleg in a wellbore, according to at least one embodiment of the present disclosure. As seen in the schematic wellbore dogleg 322 of FIG. 3, a BHA 306 may be bent to generally conform to the dogleg 322 or curved section of the wellbore. During bending, the BHA 306 may contact the wellbore wall 324 in a contact region 326. Contact of the BHA 306 with the wellbore wall 324 may increase friction and stiffen the BHA 306 at that location, thereby preventing the BHA 306 from certain types of vibration (e.g., Type 2 HFTO) or reducing certain types of vibration of the BHA 306 in the contact region 326. In some embodiments, this may cause an oscillation node (e.g., oscillation node 220 of FIG. 2) to form at the contact region 326.

Traditionally, HFTO has been considered an issue with long, rotary-steerable type assemblies. However, HFTO can be observed in steerable motor systems as evidenced by indications of HFTO-type signatures in the axial acceleration channels, as well as in the internal collar pressure. Of note, the lateral accelerations also show the signatures, but are not presented here. The oscillation in pressure can be significantly larger than in Type 1 HFTO, which is a relevant consideration in the process. The perturbations in the bit torque couple through the motor and into the collar as well as into the pressure perturbations. These pressure perturbations drive the weight on bit and hence torque oscillations. As such, HFTO can be generated in the motor collar even while sliding. This HFTO can be considered a third type of HFTO (Type 3 HFTO).

Figure 4:
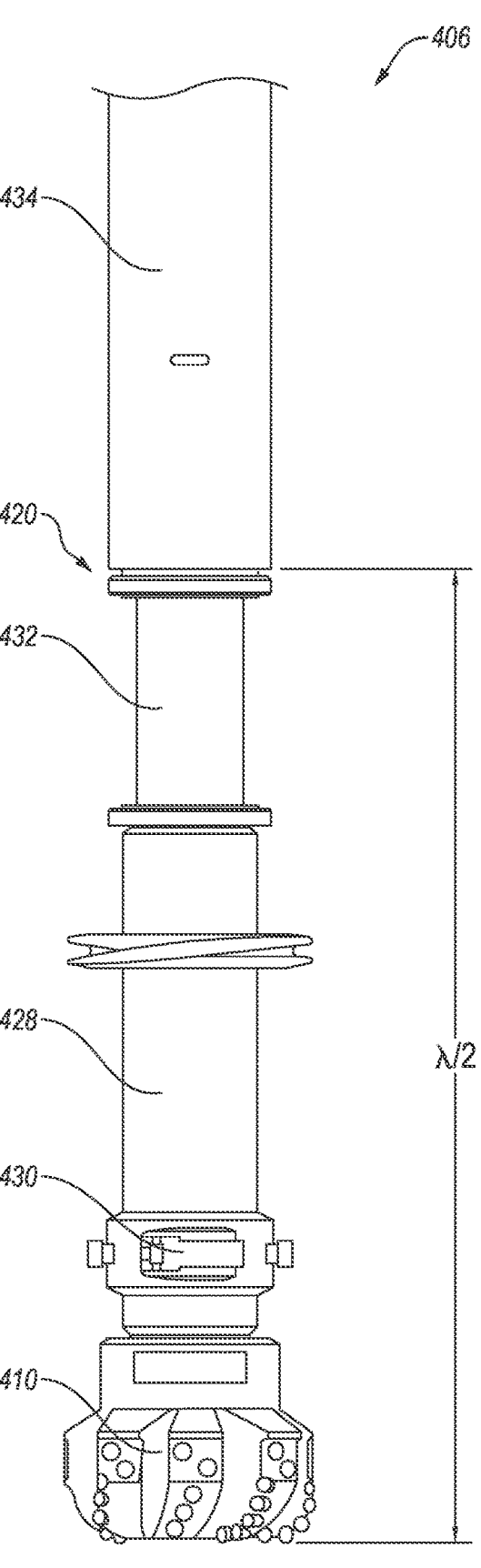
FIG. 4 is a representation of a bottomhole assembly according to at least one embodiment of the present disclosure.

FIG. 4 is a representation of a BHA 406, according to at least one embodiment of the present disclosure. The BHA 406 includes a bit 410 connected to an RSS 428. The RSS 428 includes a plurality of steering pads 430. Contact with the steering pads 430 against the wellbore wall may change the direction of the bit 410. The contact of the steering pads 430 with the wellbore wall may not be sufficient to create an oscillation node.

The BHA 406 may include one or more downhole tools 432, such as flex joint, or other downhole tools 432. The BHA 406 may further include one or more additional subs 434, such as an MWD, an LWD, a mud motor, a reamer, or any other sub 434. As may be seen, the diameter of the RSS 428 and the downhole tool 432 may be less than the diameter of the sub 434. While drilling a dogleg, the sub 434 may contact the wellbore wall. In some embodiments, a contact location with the wellbore wall may have a contact length sufficient to generate an oscillation node (schematically represented at 420). As discussed herein, the oscillation node 420 may be located a length λ/2 away from the bit 410. The bit 410 can act as another oscillation node. Torsional strain at the oscillation node 420 may result in damage to one or more portions of the BHA 406, including the downhole tool 432, the sub 434, and/or internal components thereof.

While FIG. 4 illustrates oscillation nodes at the bit 410 and 420, it will be appreciated that a BHA can be a complex system with multiple nodes and contact points along a BHA or drill string. For instance, a directional drilling BHA may include a drill bit and an underreamer. Both the drill bit and underreamer may be used in an underreaming-while-drilling operation to degrade the formation, and both may form high friction oscillation nodes. A contact point between the bit 410 and underreamer may therefore define a first length kλ1/2 with the bit 410 for HFO (e.g., Type 2), and a contact point either below or above the underreamer may form second length λ(1+k)/2 with the underreamer for HFO (e.g., Type 2). The first and second lengths may be the same or different. Consequently, the locations of the contact points associated with nodes at the bit 410 and underreamer (for example) may be evaluated in accordance with embodiments of the present disclosure to change the HFTO waveform and contact point/node location, or the location of an HFO mitigation device. By changing the associated oscillation node location for the bit 410 or underreamer, the displacement/amplitude, frequency, or other portions of the waveform may be changed. For instance, by increasing the kλ/2 length, the oscillation frequency may decrease. By decreasing oscillation frequency, the strain at the oscillation node may also decrease. Decreased oscillation frequency also results in fewer cycles over time, thereby reducing the likelihood of failure or damage due to fatigue.

Studies modelling drilling system dynamics have pursued prediction of HFTO, and in some cases have developed models of the mechanical system that produce predictions of the range of frequencies of the vibration as well as the impact of damping tools. However, the models presented have all neglected the impact of the hydraulic system and the damping due to frictional contact with the formation. Aspects of the present disclosure include considering the impact of a hydraulic system and damping due to frictional contact in the prediction of HFTO.

Figure 5:
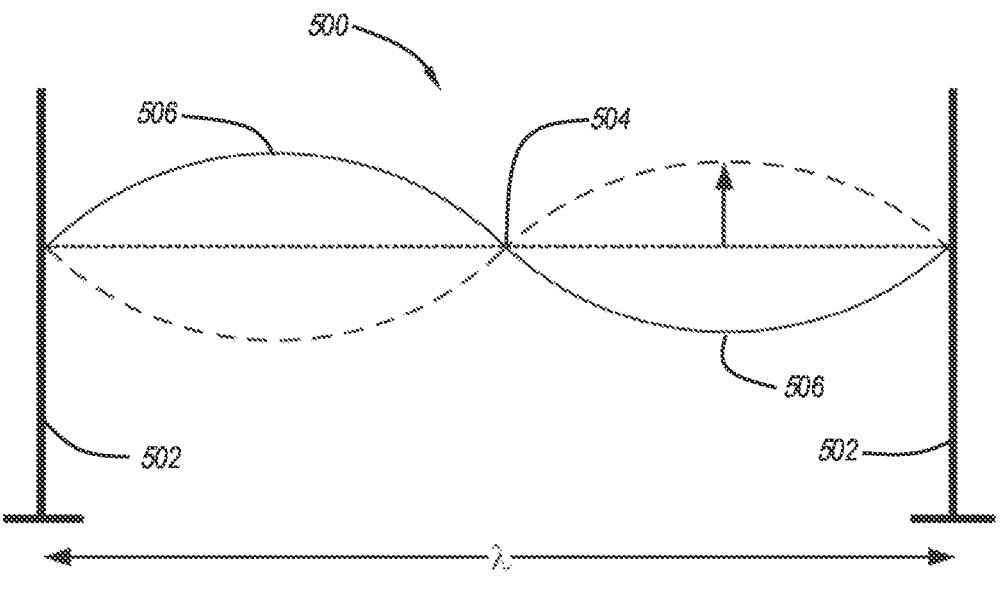
FIG. 5 is a schematic showing a suspension bridge's torsional wave amplitude along a length of the roadway, with a distance between bridge pillars being one wavelength.

When considering torsional oscillation of a long beam, one can look at the oscillation in the plane perpendicular to the axis at a single axial location. However, the amplitude variation of the oscillation along the beam should also be considered. One of the most famous examples of torsional oscillation of a long beam is the Tacoma Narrows suspension bridge. A schematic illustration of the torsional oscillation of the Tacoma Narrows bridge 500 is shown in FIG. 5. In this figure a full wavelength of the torsional oscillation is seen between the bridge pillars 502 with a node 504 at λ/2 and antinodes 506 at λ/4 and 3λ/4. The node 504 is the point of no displacement, while the antinodes 506 have the maximum displacement. Interestingly, the fundamental mode for the bridge oscillation would have an antinode 506 in the center of the bridge 500. However, the support for this section is (vertically) stiffer forcing a node 504 at this point.

In terms of damage to mechanical components, the antinode 506 will have the higher acceleration while the node 504 has the highest torsional strain. When the bridge 500 ultimately failed, it fractured at the node 504 as a result of this torsional strain.

When drilling assemblies are considered, it is apparent that some information may be missing as vibration measurements are taken at localized positions. More specifically, the vibration measurements at localized positions can miss spatial variation of vibration along the tool, although they are there. In terms of the detection, mitigation, and damage avoidance, the positions of the nodes 504 and antinodes 506 may provide useful information in some embodiments as these can drive different damage mechanisms.

The wavelength (λ) can be related to the frequency (f) of the vibration:

$$f = v/\lambda \qquad [1]$$

where v is the acoustic velocity. For continuous systems in torsional vibration, the velocity could be calculated from the equation:

$$v = \sqrt{C/\rho} \qquad [2]$$

where ρ and C are the density and modulus of rigidity of the corresponding material (e.g., collar material). For a typical collar, this velocity can be between 9,000 ft/s (2,750 m/s) and 13,000 ft/s (3,950 m/s). For instance, the velocity can be 10,200 ft/s (3,100 m/s).

By way of illustration, an example BHA can have a resonant frequency of 100-300 Hz (e.g., 200 Hz), for which the estimated wavelength can be 35 ft. (11 m) to 75 ft. (23 m). In an example, the estimated wavelength is 51 ft. (16 m). Significant variation in the HFTO characteristics along the BHA can be expected with nodes and antinodes spatially distributed at a typical collar length spacing. Thus, considering how the BHA components couple with these vibrations can be informative.

The drilling BHA is an assembly of multiple elements, all of which will play a part in the system's dynamics.

Examples of a drilling system can include, for instance, a drill bit, a directional drilling tool (e.g., a bent motor or rotary steerable), a measurement-while drilling (MWD) tool, a logging-while-drilling (LWD) tool, vibration dampers, downhole motors, drill pipes and tubulars, jars, underreamers, among others.

The nature of drilling/cutting can be a stochastic process, as such it can feed broad band torsional noise into the BHA and the drill string. This may then act as a source for any torsional oscillation, inclusive of HFTO. Drilling with more weight on bit (WOB) and rate of penetration (ROP) can trigger HFTO in some embodiments. In addition to the broad band energy from the drill bit and/or underreamer, any perturbations in WOB will couple into torque as will perturbations in flow rate and bit pressure drop.

In general, a drill bit has a higher torsional stiffness and polar moment of inertia than the rest of the BHA (often significantly higher) so it can be considered as a lumped mass. As such, perturbations in torque will couple to rotary speed and vice versa. The interaction between rotary speed and cutting torque is less certain. For instance, bit tests have shown a drop in torque as rotary speed increased, but only up to a threshold (e.g., up to 40 rpm for a particular bit design and test environment). There remains much speculation as to the mechanisms for this although no definitive conclusion has emerged. Industry simulators can require this negative torque tendency, in effect negative damping, in the bit model to trigger HFTO in the prediction. Due to the back-rake angle of the cutters on the drill bit, there can also be some coupling between torsional oscillation and axial vibration.

Steering tools are usually assumed to play a minimal part in the formation and characteristics of HFTO, apart from being components that are often damaged by HFTO. For instance, there are cases of excessive wear, cracking of the bearing housing, and erosion of flow restrictors in some steering tools.

This damage can occur where extreme cases of HFTO are present in the BHA. It is driven by flow back from the steering pads driving jets of fluid through a valve and hydraulic waves up past the steering tool control unit. This backflow is caused by the interaction between the steering pads and a ledge left by the near pad cutters driven by the HFTO vibrations.

The MWD, LWD, and other BHA instrumentation are susceptible to the mechanical vibrations. Where the tool is located in close proximity to an HFTO node, the point of maximum torsional strain, multiple tool damage mechanisms can be seen. In some MWD or survey tools, bolts holding components together (e.g., a modulator) may then back off, a circuit board may be damaged, batteries may buckle, or washouts may occur at a gap sub.

As such, tools also feature changes in the internal cross-section, they will also be susceptible to flow changes in the inner bore.

Various tools have been developed and are marketed for vibration damping, and some include marketing as HFTO dampers. HFTO dampers can generally be categorized into one of three categories, namely: (i) coupled torsional and axial; (ii) torsional dampers; and (iii) non-rotating sleeves. Examples of coupled devices include products available from Tomax AS of Stavanger, Norway and Scout Downhole of Conroe, Texas. Such tools use a screw thread to couple the torsional to axial displacements. As such, pressure perturbations inside the collar will couple into axial and torsional displacements. These tools can be more than 15 ft length, so they are limited in their BHA location and usually have to go above the MWD.

The SENTINEL tool available from SLB of Sugar Land, Texas is an example of a torsional damper. There will be no coupling between pressure waves and axial force due to changes in flow profile, but there will be coupling to the torsional vibration. The tool is about 7 ft in length so it could be mounted below the MWD, broadening its applicability.

The WTT SILENCER tool from WWT International located in Houston, Texas is an example of a non-rotating sleeve. The efficacy of such a tool is discussed herein, but as with the torsional dampers there should be no coupling between the torsional and axial channels.

In some analysis of HFTO, the drilling motor can be considered as a free end for torsional oscillation. Effectively, the rotor is a reflector. The operation of the drilling motor generates rotary speed of the bit shaft from hydraulic power, the upper and lower collars being coupled through the rotor stator. However, neglecting accelerations, the torque in the collar above the motor will generally equal the torque below. As such there will be transmission of torsional vibration through the motor, although there will be some reflection. The actual dynamic reflection/transmission characteristics can be complicated, as is location of the node along the motor. Pressure drop across the motor is a function of the torque. So torsional oscillations will couple into the mud hydraulics with perturbations in flow and pressure propagating up the string and down towards the bit.

The periodic nature of the drill pipe means the propagation of torsional vibration along the string will be a function of frequency. There will be pass bands, frequencies where torsional vibration energy will propagate up the drill string and stop bands where vibrations will be trapped in the BHA. A resonance is more likely to grow and become dominant if the frequency is in one of the stop bands.

In the drilling industry, HFTO has often been assumed to be independent of the formation contacts. However, a touch point with an incomplete azimuth, a bladed stab for example, will inject torsional energy into the BHA, so it could drive HFTO. An azimuthally continuous contact is more likely to dampen vibrations. The scale of the damping can be a function of many parameters including, the side force, the coefficient of friction, the length of the contact as well as rotary speed.

From the equations above, the frequency and wavelength of torsional vibration are linked. Although the sound speed in the BHA components will not be constant it can be considered to have little variation. Accordingly, the frequency will vary inversely with the characteristic length. Fundamentally, the actual resonance will depend on the end points and the axial position of the nodes.

HFTO can occur across a range of different drilling systems, different bit/collar sizes, with and without a motor, and with different wellbore profiles and formation characteristics. These will have different coupling and boundary conditions depending upon, for example, the drill pipe, the use of a motor, and the character of the formation contact points. The bit will be similar, in terms of the torsional coupling, across all of the applications. It is torsionally stiffer than the rest of the string and has a higher polar inertia. It can be considered as a stiff lumped mass. As torque is used to drive the vibration, the bit will not be a node (zero displacement) or an antinode (zero torque). We can consider the relative phase between the torque and torsional acceleration will be the same across all cases, so we assume the fraction of a wavelength from the bit to the first vibrational node will be the same across all systems.

Figure 6:
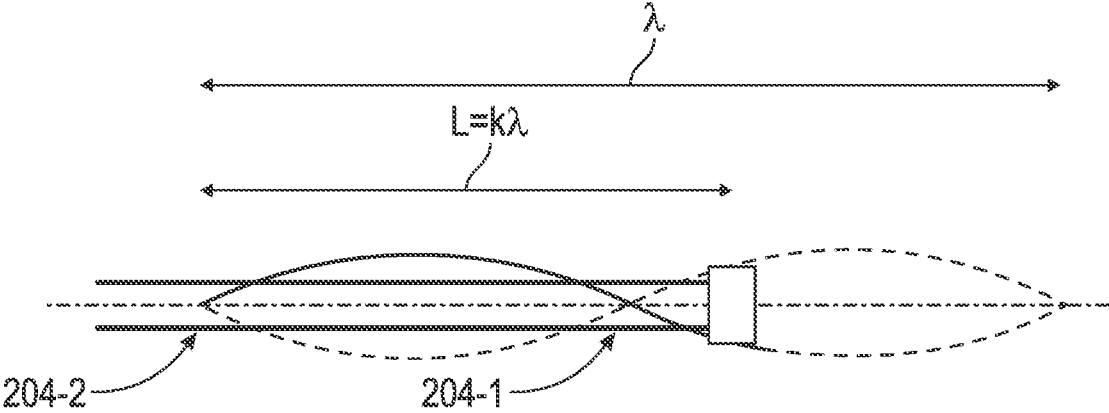
FIG. 6 is a schematic illustration of a lower portion of a BHA showing HFTO displacement amplitude variation along the BHA according to at least one embodiment of the present disclosure.

FIG. 6 is a schematic view of a lower BHA showing variation of HFTO amplitude along the BHA. The k varies only slightly across systems and the drill bit is neither a node nor an antinode. In FIG. 6, with the k fixed, the fundamental frequency of the systems can be considered so the following equation can be applied:

$$f = \frac{kv}{L},$$ [3]

where L is the distance between the bit and the first significant node (the second node 204 from the bit which is node 204-2 in this case) and k is a constant between 0.5 and 1.0. The wavelength ($\lambda$) can be further defined as:

$$\lambda = \frac{L}{k}.$$ [4]

The wavelength ($\lambda$) can be used to characterize the drilling system based on a classification of three types of HFTO as described herein.

Figure 7:
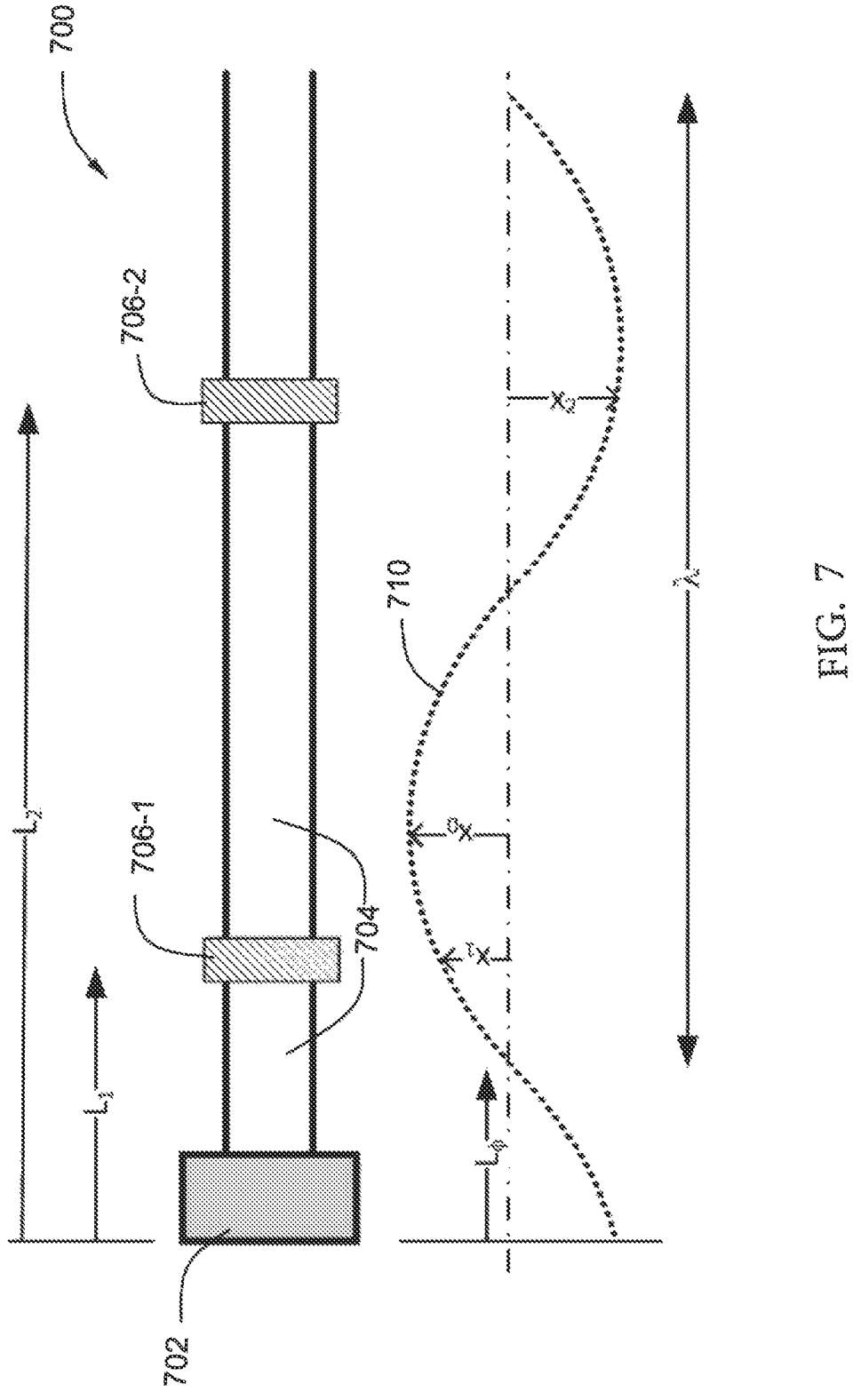
FIG. 7 is a schematic illustration of another BHA showing HFTO displacement amplitude variation along the BHA according to at least one embodiment of the present disclosure.

FIG. 7 is a schematic illustration of a BHA 700 having a drill bit 702 coupled to drill collars or other BHA components 704. The BHA 700 also includes multiple sensors 706-1, 706-2 (collectively sensors 706) that can detect vibration, acceleration, torque, or other conditions at their respective axial locations along the BHA 700. A first sensor 706-1 is closer to the drill bit 702 and located a distance $L_1$ from the drill bit 702. The second sensor 706-2 is located a distance $L_2$ from the drill bit 702, with $L_2$ being greater than $L_1$.

Also shown in FIG. 7 is a representation of the vibration dysfunction (e.g., HFTO) within the BHA 700. As shown, the amplitude of the HFTO dysfunction 710 varies along the length of the BHA 700. As a result, the position of the sensors 706 will determine the amplitude of the HFTO dysfunction 710 that is detected by the sensor.

For the HFTO dysfunction in FIG. 7, equations 5 and 6 can be used to represent the HFTO dysfunction as follows:

$$x_1 = x_0 \sin\left(2\pi\left(\frac{L_1 - L_\phi}{\lambda}\right)\right)$$ [5]

$$x_2 = x_0 \sin\left(2\pi\left(\frac{L_2 - L_\phi}{\lambda}\right)\right)$$ [6]

where $x_1$ is the amplitude of the torsional vibration measured by the first sensor 706-1, $x_2$ is the amplitude of the torsional vibration measured by the second sensor 706-2, $x_0$ is the maximum amplitude of the torsional vibration, $\lambda$ is the wavelength, and $L_\phi$ is the distance from the drill bit 102 to the first vibrational node of the torsional vibration. The first vibrational node is the downhole-most position above the drill bit 102 where the amplitude of the torsional vibration is zero.

The measurements $x_1$ and $x_2$ from the sensors 706-1 and 706-2, respectively, are at different axial positions along the BHA 700 and can measure the torsional vibration at such locations. In some embodiments, these measurements are directly measured as a rotary speed (e.g., where sensors 706 are gyros) or as a torsional acceleration (e.g., where the sensors 706 are accelerometers).

With the time series vibration measurements obtained by the sensors 706-1 and 706-2, the maximum amplitude and the frequency of the vibrational dysfunction (e.g., HFTO) can be derived. For example, a Fast Fourier Transform (fft) can be applied to the time series sensor data output by the sensors 706-1 and 706 to transform the time series sensor data into the frequency domain. The peaks in this frequency domain can be extracted and processed to identify the fundamental frequency and harmonic components of the vibrational dysfunction. The wavelength ($\lambda$) is related to the frequency (f) of the HFTO dysfunction by f=v/$\lambda$, where v is the acoustic velocity. For continuous systems in torsional vibration, the acoustic velocity v can be calculated as v= $\sqrt{\rho/C}$, where $\rho$ and C are the density and modulus of rigidity of the collar material. By way of reference only, for a typical collar in a downhole system, this acoustic velocity v is about 10,200 ft/s (3110 m/s).

With the two sensors 706-1, 706-2 at different axial positions, equations 5 and 6 can be solved analytically or numerically (e.g., with an iterative solver) to derive $x_0$ and $L_\phi$. There are multiple solutions, but the solution can be constrained by $0 < L_\phi < \lambda/2$ or in other manners. The same model can be used for characterizing the fundamental resonance and the harmonics; however, in at least some embodiments the $L_\phi$ will be the same for all modes.

According to at least some aspects, measuring the amplitude of the HFTO dysfunction without the relative phase will not provide a knowledge of the sign of $x_1$ and $x_2$, respectively. Consequently, machine learning algorithms, experience, or other factors may be used to identify the real solution (i.e., the sign of $x_1$ and $x_2$, respectively).

With the knowledge of the maximum amplitude $x_0$ and the wavelength $\lambda$ or frequency f of the HFTO dysfunction, the scale of the HFTO dysfunction can be characterized, thus estimating the energy in the HFTO dysfunction. For instance, $x_0$, $\lambda$, and $L_\phi$ can be used to estimate (or map) vibration and/or strain along the BHA 100 to determine the location where the highest fatigue and highest vibration-related damage is likely to occur. 14. The estimate (or map) of the vibration and/or strain along the BHA 100 can be a visual map or a data structure showing the spatial variation of the magnitude of vibration and/or strain along the BHA 100.

Although FIG. 7 is described in the context of measuring vibration along the length of the BHA, strain sensors may be used to similarly characterize strain along the length of the BHA. This can be analogous to torque/torsional acceleration measurements and characterizations. In still other embodiments, magnetometers can be used and differentiated for collar RPM. The differential or a Fast Fourier Transform of the signal can be taken if there is sufficient bandwidth.

Further, although FIG. 7 illustrates a BHA 100 with two sensors, other embodiments may include a single sensor. For instance, if a BHA is constrained to, or otherwise has, only a single location sensor, other correlations may be used. For example, position of the first vibrational node can be estimated from the geometry of the BHA and a map that characterizes spatial variation of vibrational dysfunction (such as HFTO) along the BHA of a drilling system can be generated from the estimated position of the first vibrational node and measurements of vibration amplitude and vibration frequency by the single sensor disposed at a fixed axial position along the BHA. For example, a Fast Fourier Transform (fft) can be applied to the time series sensor data to transform the time series sensor data into the frequency domain. The peaks in this frequency domain can be extracted and processed to identify the fundamental frequency and harmonic components of the vibrational dysfunction. From field observations, it has been observed that an example correlation can include kv=6000 ft/s (1830 m/s), where kA is the distance to the second node (i.e., second position nearest the bit 102 where the oscillation amplitude is zero). From this correlation, $L_\phi$=0.088λ. Of note, this correlation is an estimate, and is expected to be improved with further data or other BHA designs.

With this or a similar correlation and data from a single sensor, the characteristics of the torsional oscillation or other dysfunction can be derived. There is also a further opportunity with the derivation. This includes where sensors are added to test a specific tool (for instance, above and below a vibration damper), in order to measure the difference in dynamics across the tool. The derivation of the actual dysfunction characteristics will allow the impact of the spatial variation along the BHA to be removed from this analysis, significantly reducing the uncertainty in the conclusion.

Using the sensor measurements and computational models as described herein, the spatial variation of vibrational dysfunction (e.g., HFTO) along the length of the BHA of a drilling system can be characterized and possibly mitigated. Specifically, once the nodal position and the type of the vibrational dysfunction have been identified, this information can be used to mitigate the vibrational dysfunction. For example, for Type 1 (motor driven) HFTO, WOB can be reduced and then increased at a slower rate. For Type 2 (contact point driven) HFTO, the local tortuosity of the BHA can be reduced by back reaming or drilling a straight section.

Existing HFTO damper tools mounted above an MWD can be at least partially effective against Type 1 HFTO. However, as they are mounted above the MWD tool they are (usually) too far up the string to see any significant Type 2 HFTO, they are ineffective for Type 2 HFTO dysfunction.

For Type 2 HFTO, preventing the formation of a node will provide effective mitigation. Installing a wear band at the lower contact points can achieve this objective and mitigate the HFTO.

For Type 3 HFTO, the HFTO is seen to occur with a conventional steerable motor and it occurs while rotating or sliding. The HFTO includes resonance coupled from bit torque through internal pressure to WOB and bit torque. The frequency is in the range of 50-150 Hz and damage has been seen to include battery buckling. Mitigation can be done using vibration dampers or pressure wave attenuation.

The embodiments described herein generally include systems and methods that facilitate operation of well-related tools. In certain embodiments, a variety of data (e.g., downhole data and/or surface data) may be collected to enable optimization and evaluation of operations related to the well-related tools. In certain embodiments, the collected data may be provided as advisory data (e.g., presented to human operators of the well to inform control actions performed by the human operators) and/or used to facilitate automation of downhole processes and/or surface processes (e.g., which may be automatically performed by a computer implemented downhole or surface processing system (e.g., a drilling tool or a well control system), without intervention from human operators). In certain embodiments, the systems and methods described herein may enhance downhole operations by improving the efficiency and utilization of data to enable performance optimization and improved resource controls of the downhole operations. In certain embodiments, a downhole well tool may be deployed downhole into a wellbore via a drill string, or may include drill mud pumped into the wellbore. In certain embodiments, the systems and methods described herein may be used for displaying or otherwise outputting desired (e.g., optimal) actions to human operators so as to enable improved decision-making regarding operation of the well tool (e.g., operation of a downhole or surface system/device).

In certain embodiments, downhole parameters are obtained via, for example, downhole sensors while the downhole well tool is in the wellbore. In certain embodiments, the downhole parameters may be obtained by the downhole sensors in substantially real time (e.g., as the downhole data is detected while the downhole well tool is being operated), and sent to the surface processing system (or other suitable processing system) via wired or wireless telemetry. The downhole parameters may be combined with surface parameters. In certain embodiments, the downhole and/or surface parameters may be processed during operation of the well tool downhole to enable automatic optimization (e.g., by the surface processing system, without human intervention) with respect to the operation of the well tool during subsequent stages of well tool operation. In some embodiments, downhole parameters are obtained by surface or uphole sensors using inversion techniques.

Figure 8:
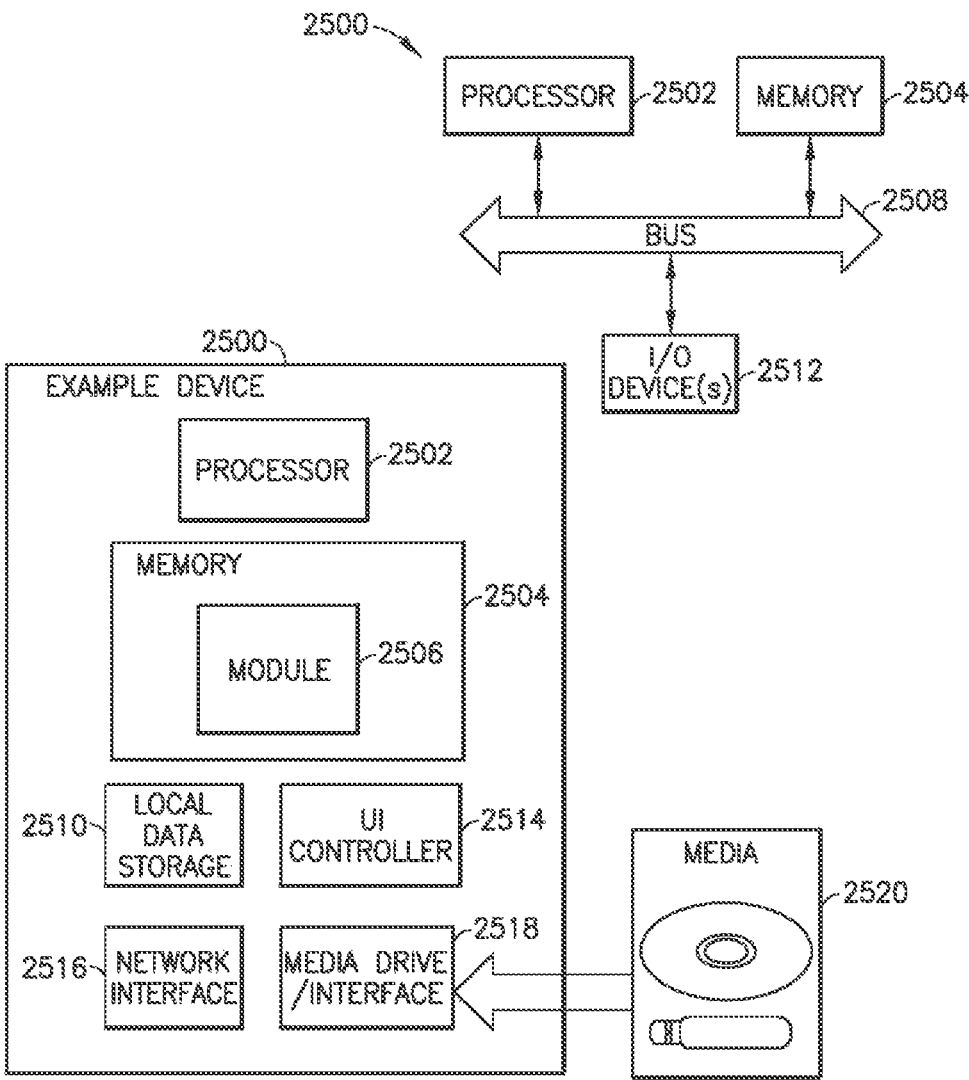
FIG. 8 is a block diagram of an example computer processing system.

In some embodiments, the methods and systems of the present disclosure may be embodied by a computing system. FIG. 8 illustrates an example computing system 2500, with a processor 2502 and memory 2504 that can be configured to implement various embodiments of the methods and systems as discussed in the present application. For example, various steps or operations of the processes or systems as described herein can be embodied by computer program instructions (software) that execute on the device 2500. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes and systems of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server over a communication network (e.g., the Internet).

In the description herein, various relational terms may be used to facilitate an understanding of various aspects of some embodiments of the present disclosure. Relational terms such as "bottom," "below," "top," "above," "back," "front," "left," "right," "rear," "forward," "up," "down," "horizontal," "vertical," "clockwise," "counterclockwise," "upper," "lower," and the like, may be used to describe various components, including their operational or illustrated position relative to one or more other components. Relational terms do not indicate a particular orientation for each embodiment within the scope of the description or claims but are intended for convenience in facilitating reference to various components. Thus, such relational aspects may be reversed, flipped, rotated, moved in space, placed in a diagonal orientation or position, placed horizontally or vertically, or similarly modified.

Certain descriptions or designations of components as "first," "second," "third," and the like are also used to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it will not preclude there being a single element, or more than one, of the additional element. Where the claims or description refer to "a" or "an" element, such reference is not to be construed that there is just one of that element but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

What is claimed is:

1. A downhole system, comprising:
a bottomhole assembly (BHA) including a drill bit;
a first sensor disposed at a first distance from the drill bit;
a second sensor disposed at a second distance from the drill bit, wherein the second distance is greater than the first distance; and
at least one processor that is part of or coupled to the BHA, the at least one processor configured to obtain data including respective vibrational amplitudes from the first sensor and the second sensor and use an acoustic velocity and the data to determine data characterizing spatial variation of vibration along at least a portion of a length of the BHA, wherein using the data includes deriving a vibrational frequency.

2. The downhole system of claim 1, wherein:
the first and second sensors are configured to measure acceleration or rotation of the BHA.

3. The downhole system of claim 1, wherein:
the at least one processor is configured to use an axial position of a vibration node to determine the data characterizing spatial variation of the vibration along the at least a portion of the length of the BHA.

4. The downhole system of claim 1, wherein:
the at least one processor is configured to determine a maximum amplitude of the vibration by solving a system of equations that relates the maximum amplitude of the vibration to the respective vibrational amplitudes measured by the first and second sensors.

5. The downhole system of claim 4, wherein:
the system of equations further includes a distance to a first vibrational node, the first distance between the first sensor and the drill bit, the second distance between the second sensor and the drill bit, and a wavelength.

6. The downhole system of claim 5, wherein:
the wavelength is determined from the vibrational frequency derived from the data from at least one of the first sensor and second sensor.

7. The downhole system of claim 1, wherein:
the first and second sensors are configured to measure axial strain.

8. The downhole system of claim 1, wherein:
the first and second sensors comprise magnetometers.

9. The downhole system of claim 8, wherein:
the at least one processor is configured to differentiate measurement data obtained from the magnetometers to determine collar rotational speed.

10. A method for determining spatial variation of vibration along a bottomhole assembly (BHA) including a drill bit, the method comprising:
obtaining first data including a first vibrational amplitude with a first sensor at a first distance from the drill bit;
obtaining second data including a second vibrational amplitude with a second sensor at a second distance from the drill bit, the second distance being greater than the first distance; and
using, via at least one processor that is part of or coupled to the BHA, acoustic velocity and the first and second data to determine data characterizing spatial variation of vibration along at least a portion of a length of the BHA, wherein using the first and second data includes deriving a vibrational frequency.

11. The method of claim 10, further comprising:
determining, via the at least one processor that is part of or coupled to the BHA, a maximum amplitude of the vibration by solving a system of equations that relates the maximum amplitude of the vibration to the first and second vibrational amplitudes measured by the first and second sensors.

12. The method of claim 11, wherein the system of equations further includes a distance to a first vibrational node, the first distance between the first sensor and the drill bit, the second distance between the second sensor and the drill bit, and a wavelength.

13. The method of claim 12, wherein:
the wavelength is determined from the vibrational frequency derived from the data from at least one of the first sensor and second sensor.

14. A downhole system, comprising:
a bottomhole assembly (BHA) including a drill bit;
a first sensor disposed at a first distance from the drill bit;
a second sensor disposed at a second distance from the drill bit, wherein the second distance is greater than the first distance; and
at least one processor that is part of or coupled to the BHA, the at least one processor configured to:
obtain data from the first sensor and the second sensor and use the data to determine data characterizing spatial variation of vibration along at least a portion of a length of the BHA; and
determine a maximum amplitude of the vibration by solving a system of equations that relates the maximum amplitude of the vibration to vibrational amplitudes measured by the first and second sensors, wherein the system of equations further includes a distance to a first vibrational node, the first distance between the first sensor and the drill bit, the second distance between the second sensor and the drill bit, and a wavelength.

15. The downhole system of claim 14, wherein:
the wavelength is determined from a vibration frequency derived from the data from at least one of the first sensor and second sensor.

16. The downhole system of claim 14, wherein:
the first and second sensors are configured to measure acceleration or rotation of the BHA.

17. The downhole system of claim 14, wherein:
the first and second sensors are configured to measure axial strain.

18. A method for determining spatial variation of vibration along a bottomhole assembly (BHA) including a drill bit, the method comprising:
obtaining first data with a first sensor at a first distance from the drill bit;
obtaining second data with a second sensor at a second distance from the drill bit, the second distance being greater than the first distance;
using, via at least one processor that is part of or coupled to the BHA, the first and second data to determine data characterizing spatial variation of vibration along at least a portion of a length of the BHA; and
determining, via the at least one processor that is part of or coupled to the BHA, a maximum amplitude of the vibration by solving a system of equations that relates the maximum amplitude of the vibration to vibrational amplitudes measured by the first and second sensors, wherein the system of equations further includes a distance to a first vibrational node, the first distance between the first sensor and the drill bit, the second distance between the second sensor and the drill bit, and a wavelength.

19. The method of claim 18, wherein:
the first and second sensors are configured to measure acceleration or rotation of the BHA.

20. The method of claim 18, wherein:
the first and second sensors are configured to measure axial strain.

* * * * *